Sept. 2, 1947.  H. G. HUGHEY  2,426,690
APPARATUS FOR CUTTING METAL
Filed March 13, 1944
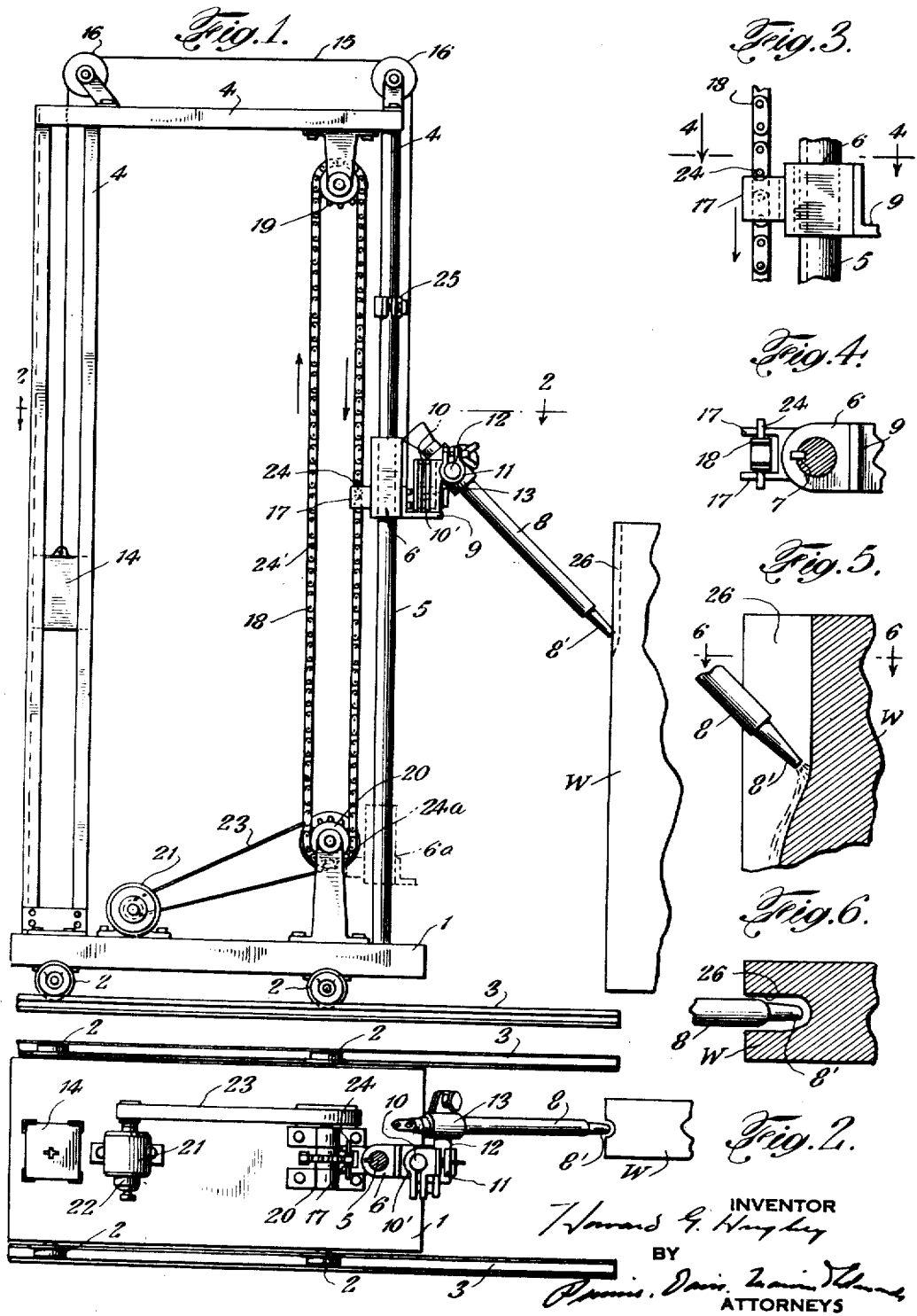
INVENTOR
Howard G. Hughey
BY
ATTORNEYS Patented Sept. 2, 1947

2,426,690

UNITED STATES PATENT OFFICE 2,426,690

APPARATUS FOR CUTTING METAL

Howard G. Hughey, Fanwood, N. J., assignor to Air Reduction Company, Incorporated, a corporation of New York Application March 13, 1944, Serial No. 526,193

7 Claims. (Cl. 266—23)

This invention relates to apparatus for cutting or machining metal by means of a gas torch such as an oxyacetylene torch. More particularly it relates to apparatus for either grooving or completely severing metal pieces of relatively large cross-section.

If a thick metal work-piece is grooved by moving a gas cutting torch across it in a horizontal plane the slag must be blown clear of the groove by the force of the gas stream and in deep grooving this is impracticable.

According to the present invention the apparatus is adapted to groove a vertical face of the metal work-piece by movement of the torch tip in a vertical plane thus permitting the slag to be discharged naturally by gravity and causing its downward travel to be accentuated by the force of the gas stream. Improved means are provided for effecting the required vertical movement of the torch and for feeding the torch horizontally toward the work-piece so that the depth of the groove may be increased by successive cutting strokes of the torch. The torch and tip are of such design that they produce a groove of sufficient width for the torch to enter, and the maximum thickness of metal that can be cut is limited only by practical physical limitations of length and rigidity of the torch. Provided the thickness of the metal does not exceed such physical limitations of the torch, the work-piece, even though relatively thick may be cut completely through if so desired.

Apparatus embodying the invention is illustrated in a more or less schematic manner in the accompanying drawing, in which:

Figure 1 is a side elevation of the apparatus;

Fig. 2 is a horizontal section taken on the line 2—2 of Fig. 1;

Fig. 3 is an enlarged detail view showing a portion of the torch-support and the chain which moves it downwardly;

Fig. 4 is a horizontal section taken on the line 4—4 of Fig. 3;

Fig. 5 is a vertical section taken through the work-piece substantially in the plane of the groove illustrating the manner in which the torch cuts the groove and is capable of entering it; and Fig. 6 is a horizontal section taken on the line 6—6 of Fig. 5.

The apparatus shown in the drawing comprises a carriage 1 provided with wheels 2 adapted to run on a track 3. All parts of the apparatus are mounted on the carriage 1 so that by moving the carriage along the track from left to right, as viewed in Fig. 1, the cutting torch may be advanced in the direction of the work-piece W as will hereinafter appear.

Mounted on the carriage 1 is a frame work of any appropriate character designated 4 in its entirety. The forward member of the frame comprises a vertical post 5 constituting a guide on which a torch-support 6 is slidable. The torch-support is represented in the drawing as being a sleeve which is slidably keyed to the guide post 5 as shown at 7 (Fig. 4). A gas cutting torch 8, such as an oxyacetylene torch, is mounted on the support 6 in any suitable way preferably so that it can be inclined downwardly and its tip 8' directed toward a vertical face of the work-piece W, as shown in Fig. 1. For instance, the support 6 may carry a bracket 9 having a vertical post 10 to which a split sleeve 10' of a bracket may be clamped. This bracket has another split sleeve 11 adapted to be clamped to a horizontal stud 12 on the torch holder 13. If desired the torch holder may be of the type which permits adjustment of the torch longitudinally in the holder. Thus the torch may be adjusted about the axis of the vertical post 10, about the axis of the horizontal stud 12, and in the direction of its own axis in the holder 13.

A counterweight 14 is guided in the rear portion of the frame 4 and is connected to the torch-support by means of a cable 15 passing over pulleys 16 mounted on the upper part of the frame. The counterweight is sufficiently heavy to overcome the weight of the torch-support and the parts caused by it and also friction, so that the counter-weight will return the torch-support to its starting position near the top of the guide after the power means has moved it downwardly to complete a cutting stroke as hereinafter described.

The torch-support 6 has a fork whose two arms 17 project rearwardly from the torch-support, as best shown in Fig. 4. An endless chain 18 passes around upper and lower sprockets 19 and 20 respectively and is so positioned that its forward vertical run passes between the fork arms 17 on the torch-support. The upper chain sprocket 19 may be rotatably mounted on the upper part of the frame 4, as shown in Fig. 1, and the lower sprocket 20 may be rotatably supported on the platform of the carriage 1. An electric motor 21 provided with an adjustable speed control governor 22 drives the lower sprocket 20 by means of a belt 23.

The chain 18 is continuously moved by the motor in the direction indicated by the arrows in Fig. 1 so that the forward run of the chain travels downwardly at a uniform speed corresponding to the speed at which it is desired to move the torch during its cutting stroke. The chain carries a pin 24 whose end portions project laterally far enough beyond the links of the chain to engage with the fork arms 17 on the torch-support, as shown in Fig. 4. When the torch-support is in its uppermost position on the guide post 5 it is in engagement with an adjustable stop member 25 clamped to the guide post. When the end portions of the downwardly moving pin on the chain engage with the fork arms 17 on the torch-support the torch-support is caused to move downwardly with the chain. In Fig. 1 the torch-support is represented as in the course of being moved downwardly by the pin on the chain. It has moved far enough to cause the torch to start grooving the work-piece W, as represented at 26. The torch-support is moved downwardly by the chain and pin until it reaches its lowermost position indicated by the broken lines 6a in Fig. 1. The downward movement of the torch-support is then discontinued because the pin 24 is guided around the lower sprocket 20 and disengages the fork arms 17 on the torch-support. The parts are so related that by the time the torch-support reaches its lowermost position 6a the torch will have grooved the vertical face of the work-piece W throughout its entire length, or so much thereof as it is desired to groove.

When the pin 24 disengages the fork arms 17 the torch-support is automatically moved upwardly and rapidly returned to its starting position against the stop 25 by the counterweight 14. The starting position of the torch-support is determined by the location of this stop which is adjustable on the guide post 5. The speed of the chain travel determines the period of rest of the torch before the pin again engages the fork arms 17 on the torch-support to produce another cutting stroke of the torch. During this period of rest the work may be preheated by the torch in a manner well understood in the art. If desired several pins like that shown at 24 may be carried by the chain. For instance, another pin 24' may be carried by the chain so that it is about half way up the rear run of the chain when the pin 24 is about half way down the forward run of the chain.

After each downward pass of the torch the entire mechanism is moved forward a predetermined distance by advancing the carriage 1 along its track 3 so that the succeeding downward pass of the torch will cut the groove deeper into the work-piece. Movement of the carriage on its track may be effected by hand or automatically at the proper time by any suitable means. As best shown in Figs. 5 and 6 the torch and torch tip are so designed that the torch can enter the groove 26 cut in the vertical face of the work-piece. Thus the grooving operation can be continued until the work-piece is completely severed, if so desired, provided the torch 8 projects from its holder a sufficient distance to accomplish this.

As will be clear from Figure 5 the slag produced during the cutting operation will flow by gravity from the groove although its downward travel will be assisted by the force of the air stream. The slag does not have to be blown clear as is the case when a work-piece is grooved by movement of a torch across it in a horizontal plane.

I claim:

1. In an apparatus for deep-grooving or cutting relatively thick metal pieces including a base, a vertical guide on the base, a torch support mounted for vertical movement along said guide, a torch mounted on said torch support and an endless chain having one run substantially parallel to and adjacent the path of movement of the torch support for causing the torch support to move along said guide; the improvement which comprises means for imparting a downward movement to said run of the chain, and a member carried by said chain and projecting therefrom, said member being so constructed and arranged as to engage a part of the torch support as it moves downwardly with said run of the chain and to move the torch support downwardly along said guide, said member automatically disengaging said part of the torch support when it approaches the bottom of said run of the chain, whereby the torch carried by the torch support will make a downwardly-progressing vertical cut or groove in a piece of metal positioned adjacent thereto and the force of the jet issuing from the torch will blow the resulting slag out of the groove or cut.

2. Apparatus as set forth in claim 1 having means for moving the torch support vertically upwardly along said guide when the member projecting from the chain disengages the torch support, and an adjustable stop on said guide to limit the upward movement of the torch support on the guide.

3. In an apparatus for deep-grooving or cutting relatively thick metal pieces including a base, a vertical guide on the base, a torch support mounted for vertical movement along said guide, a torch mounted on said torch support and an endless chain having one run substantially parallel to and adjacent the path of movement of the torch support for causing the torch support to move along said guide; the improvement which comprises means for imparting a downward movement to said run of the chain, a fork extending from the torch support and straddling said run of the chain, and a member carried by said chain and projecting therefrom, said member being constructed and arranged to engage the fork as it moves downwardly with said run of the chain and to move the torch support downwardly along said guide, whereby the torch carried by the torch support will make a downwardly-progressing vertical cut or groove in a piece of metal positioned adjacent thereto and the force of the jet issuing from the torch will blow the resulting slag out of the groove or cut.

4. A torch apparatus comprising a base, a guide carried by the base, a torch support mounted for movement along said guide, a torch mounted on said torch support, continuously-operating, motor - driven, motion - transmitting means for moving said torch support along said guide, means for operatively connecting the torch support to said motion-transmitting means to cause said torch support to move continuously, from a starting position, along said guide to the end of an operation stroke, causing said means for operative connecting means to be disconnected at the end of the operation stroke, means for returning the torch support, after an operation stroke, to said starting position, and means for automatically again operatively connecting the torch support to said motion-transmitting means after it has reached said starting position, said automatic means being ineffective to again operatively connect the torch support and the motion-transmitting means until a predetermined interval of time, after the torch support again reaches said starting position during which the torch remains at rest.

5. A torch apparatus comprising a base, a vertical guide carried by the base, a torch support mounted for movement along said guide, a torch mounted on said torch support, a continuously-operating, motor-driven, motion-transmitting means having at least a portion thereof extending substantially parallel to said guide for moving said torch support along said guide, means for operatively connecting the torch support to said motion-transmitting means to cause said torch support to move continuously, from a starting position, along said guide to the end of an operation stroke, means for automatically causing said operative connecting means to be disconnected at the end of the operation stroke, means for automatically returning the torch support, after an operation stroke, to said starting position and means for automatically again connecting the torch support to said motion-transmitting means after it has reached said starting position, said automatic means being ineffective to again operatively connect the torch support and the motion-transmitting means until a predetermined interval of time, after the torch support again reaches said starting position during which the torch remains at rest.

6. A torch apparatus comprising a base, a guide carried by the base, a torch support mounted for movement along said guide, a torch mounted on said torch support, continuously-operating, motion-transmitting means for moving said torch support, from a starting position, along said guide in an operation stroke, and means for returning the torch support, after an operation stroke, to said starting position, said continuously-operating means being ineffective to move the torch support along the guide from the starting position on a successive operation stroke until a predetermined interval of time after the torch support again reaches the starting position, during which the torch remains at rest.

7. A torch apparatus comprising a base, a guide carried by the base, a torch support mounted for movement along said guide, a torch mounted on said torch support, continuously-operating, motion-transmitting means for moving said torch support, from a starting position, along said guide in an operation stroke, and means for returning the torch support, after an operation stroke, to said starting position, said continuously-operating means being ineffective to move the torch support along the guide from the starting position on a successive operation stroke until a predetermined interval of time after the torch support again reaches the starting position, during which the torch remains at rest, the means for returning the torch support to said starting position being effective to move the torch support at a faster rate than the torch support moves during an operation stroke.

HOWARD G. HUGHEY.

REFERENCES CITED

The following references are of record in the file of this patent:

UNITED STATES PATENTS

| Number | Name | Date |
|---|---|---|
| 820,988 | Pestor | May 22, 1906 |
| 1,463,221 | Mitchell | July 31, 1923 |
| 2,283,346 | Bucknam et al. | May 19, 1942 |
| 2,317,239 | Yoch | Apr. 20, 1943 |
| 2,334,250 | Cassens et al. | Nov. 16, 1943 |
| 2,184,560 | Moss | Dec. 26, 1939 |

---

Certificate of Correction

Patent No. 2,426,690.  September 2, 1947.

HOWARD G. HUGHEY

It is hereby certified that error appears in the printed specification of the above numbered patent requiring correction as follows: Column 4, lines 67 and 68, claim 4, for the words "causing said means for" read *means for causing said*; and that the said Letters Patent should be read with this correction therein that the same may conform to the record of the case in the Patent Office.

Signed and sealed this 28th day of October, A. D. 1947.

[SEAL]

THOMAS F. MURPHY,
*Assistant Commissioner of Patents.* operatively connect the torch support and the motion-transmitting means until a predetermined interval of time, after the torch support again reaches said starting position during which the torch remains at rest.

5. A torch apparatus comprising a base, a vertical guide carried by the base, a torch support mounted for movement along said guide, a torch mounted on said torch support, a continuously-operating, motor-driven, motion-transmitting means having at least a portion thereof extending substantially parallel to said guide for moving said torch support along said guide, means for operatively connecting the torch support to said motion-transmitting means to cause said torch support to move continuously, from a starting position, along said guide to the end of an operation stroke, means for automatically causing said operative connecting means to be disconnected at the end of the operation stroke, means for automatically returning the torch support, after an operation stroke, to said starting position and means for automatically again connecting the torch support to said motion-transmitting means after it has reached said starting position, said automatic means being ineffective to again operatively connect the torch support and the motion-transmitting means until a predetermined interval of time, after the torch support again reaches said starting position during which the torch remains at rest.

6. A torch apparatus comprising a base, a guide carried by the base, a torch support mounted for movement along said guide, a torch mounted on said torch support, continuously-operating, motion-transmitting means for moving said torch support, from a starting position, along said guide in an operation stroke, and means for returning the torch support, after an operation stroke, to said starting position, said continuously-operating means being ineffective to move the torch support along the guide from the starting position on a successive operation stroke until a predetermined interval of time after the torch support again reaches the starting position, during which the torch remains at rest.

7. A torch apparatus comprising a base, a guide carried by the base, a torch support mounted for movement along said guide, a torch mounted on said torch support, continuously-operating, motion-transmitting means for moving said torch support, from a starting position, along said guide in an operation stroke, and means for returning the torch support, after an operation stroke, to said starting position, said continuously-operating means being ineffective to move the torch support along the guide from the starting position on a successive operation stroke until a predetermined interval of time after the torch support again reaches the starting position, during which the torch remains at rest, the means for returning the torch support to said starting position being effective to move the torch support at a faster rate than the torch support moves during an operation stroke.

HOWARD G. HUGHEY.

REFERENCES CITED

The following references are of record in the file of this patent:

UNITED STATES PATENTS

| Number | Name | Date |
|---|---|---|
| 820,988 | Pestor | May 22, 1906 |
| 1,463,221 | Mitchell | July 31, 1923 |
| 2,283,346 | Bucknam et al. | May 19, 1942 |
| 2,317,239 | Yoch | Apr. 20, 1943 |
| 2,334,250 | Cassens et al. | Nov. 16, 1943 |
| 2,184,560 | Moss | Dec. 26, 1939 |

---

Certificate of Correction

Patent No. 2,426,690. September 2, 1947.

HOWARD G. HUGHEY

It is hereby certified that error appears in the printed specification of the above numbered patent requiring correction as follows: Column 4, lines 67 and 68, claim 4, for the words "causing said means for" read *means for causing said*; and that the said Letters Patent should be read with this correction therein that the same may conform to the record of the case in the Patent Office.

Signed and sealed this 28th day of October, A. D. 1947.

[SEAL]

THOMAS F. MURPHY,
*Assistant Commissioner of Patents.*